(12) United States Patent
Molinero Arenas et al.

(10) Patent No.: US 11,548,817 B2
(45) Date of Patent: Jan. 10, 2023

(54) METHOD FOR THE MANUFACTURE OF MINERAL WOOL PRODUCTS WITH A PHENOL-FORMALDEHYDE RESOLE BASED BINDER

(71) Applicant: URSA Insulation, S.A., Madrid (ES)

(72) Inventors: Alejandro Molinero Arenas, Madrid (ES); Ana Isabel Aznar Écija, Tarragona (ES); Mireia Querol Piñot, Tarragona (ES); Arturo Luís Casado Dominguez, Madrid (ES)

(73) Assignee: URSA Insulation, S.A., Madrid (ES)

( * ) Notice: Subject to any disclaimer, the term of this patent is extended or adjusted under 35 U.S.C. 154(b) by 0 days.

(21) Appl. No.: 16/330,994

(22) PCT Filed: Oct. 26, 2017

(86) PCT No.: PCT/EP2017/077482
§ 371 (c)(1),
(2) Date: Mar. 6, 2019

(87) PCT Pub. No.: WO2018/078033
PCT Pub. Date: May 3, 2018

(65) Prior Publication Data
US 2019/0256414 A1    Aug. 22, 2019

(30) Foreign Application Priority Data
Oct. 27, 2016  (EP) ..................................... 16196045

(51) Int. Cl.
| | | |
|---|---|---|
| *C03C 25/34* | (2006.01) | |
| *C03C 13/06* | (2006.01) | |
| *C08G 14/08* | (2006.01) | |
| *D04H 1/587* | (2012.01) | |

(52) U.S. Cl.
CPC .............. *C03C 25/34* (2013.01); *C03C 13/06* (2013.01); *C08G 14/08* (2013.01); *C03C 2213/00* (2013.01); *D04H 1/587* (2013.01)

(58) Field of Classification Search
CPC .................................................... C03C 25/34
See application file for complete search history.

(56) References Cited

U.S. PATENT DOCUMENTS

| | | | | |
|---|---|---|---|---|
| 2,748,101 | A * | 5/1956 | Shappell | C08G 8/00 |
| | | | | 524/405 |
| 3,932,334 | A * | 1/1976 | Deuzeman | C08G 14/00 |
| | | | | 524/541 |
| 4,663,419 | A | 5/1987 | Fugier et al. | |
| 4,904,516 | A * | 2/1990 | Creamer | C04B 41/45 |
| | | | | 528/129 |
| 5,538,761 | A * | 7/1996 | Taylor | C08K 9/08 |
| | | | | 528/146 |
| 6,342,271 | B1 * | 1/2002 | Lericque | C03C 25/24 |
| | | | | 427/385.5 |
| 6,893,579 | B2 | 5/2005 | Espiard et al. | |
| 9,242,899 | B2 | 1/2016 | Caslo-Cabado et al. | |
| 2007/0191574 | A1 * | 8/2007 | Miller | D04H 1/64 |
| | | | | 528/129 |

FOREIGN PATENT DOCUMENTS

| | | |
|---|---|---|
| EP | 0253488 A2 * | 1/1988 |
| EP | 2657266 | 10/2013 |
| JP | S60-139715 | 7/1985 |
| JP | 2015-527431 | 9/2015 |
| WO | 01/96254 | 12/2001 |
| WO | 2013/057432 | 4/2013 |

OTHER PUBLICATIONS

International Search Report in parallel PCT Application No. PCT/EP2017/077482 dated Feb. 6, 2018.

* cited by examiner

*Primary Examiner* — Tabatha L Penny
(74) *Attorney, Agent, or Firm* — Dicke, Billig & Czaja, PLLC

(57) ABSTRACT

A method for the manufacture of mineral wool, is disclosed. In one example, the method comprises reacting an aqueous phenol-formaldehyde resole with free formaldehyde with a first amount of urea, thereby preparing a prereact; contacting the prereact with a second amount of urea; applying the resulting mixture of prereact and second amount of urea, as part of a binder, optionally with additives, to the surface of mineral fibers; and curing the binder on the surface of the mineral fibers. The total amount of urea used ranges 10-40 wt. % relative to the sum of the dry weight of the phenol-formaldehyde resole and the total amount of urea, and the second amount of urea used is at least 40 wt.-% of the total amount of urea. The invention also relates to a mineral wool product with reduced emissions of formaldehyde obtained by the method.

7 Claims, No Drawings

METHOD FOR THE MANUFACTURE OF MINERAL WOOL PRODUCTS WITH A PHENOL-FORMALDEHYDE RESOLE BASED BINDER

CROSS REFERENCE TO RELATED APPLICATION

This Utility Patent Application claims priority under 35 U.S.C. § 371 to International Application Serial No. PCT/EP2017/077482, filed Oct. 26, 2017, which claims the benefit of European Patent Application No. EP 16196045.5, filed Oct. 27, 2016; which are both incorporated herein by reference.

FIELD OF THE INVENTION

The present invention relates to a method for manufacturing mineral wool products with binders based on phenol-formaldehyde resoles. The mineral wool products obtained are primary intended to be used as thermal and acoustic insulation of objects such as buildings, transportation, air-conducting ducts and appliances.

BACKGROUND

Mineral wool products are widely used for the thermal and acoustic insulation of different parts of buildings, transportations, or appliances, as well as for fire protection. Mineral wool materials are mainly randomly interlaced masses of mineral fibers with varying lengths and usually bound by a cured resin-based binder. Three types of mineral materials are most commonly employed, glass, stone or slag. Processes for the production of mineral wool products are well known in the art, and usually comprise the steps of melting the mineral material to an adequate temperature, fiberizing the molten mixture into fine fibers, application (mainly spraying) of an uncured liquid binder composition to the individual fibers while they still have some residual heat, collection of the fibers and formation of a primary fleece on a foraminous conveyor, densifying the fleece, and curing the binder at elevated temperatures. The cured mat is then cut to the desired size with transverse and edge trimmers, before it is packaged for transport.

The most extensively used binders are based on thermo-setting aqueous phenol-formaldehyde resoles, due to their good performance and attractive low cost. Most common phenol-formaldehyde resoles used for this purpose are manufactured by phenol methylolation with formaldehyde and partial condensation in aqueous solution, catalyzed by strong alkaline substances. A detailed description of the preparation and characteristics of phenol-formaldehyde resoles suitable to be used in binders for mineral wool can be found for instance in '*Phenolic Resins: A Century of Progress*', chapter 10, edited by L. Pilato and published by Springer-Verlag in 2010.

Phenol-formaldehyde resoles for mineral wool production are characterized by being prepared with a stoichiometric excess of formaldehyde, which results in free, unreacted, formaldehyde being mixed with the resole reaction product. In the recent years, there has been an increasing concern about the toxicity of formaldehyde, and formaldehyde containing materials, which has led to the development of approaches to cope with this concern.

In this respect, urea has been found highly useful, so much that it is nowadays mostly always added to the resoles used for mineral wool manufacture. Urea plays a dual role: first, it acts as a formaldehyde scavenger, reacting with the free formaldehyde in the resole and thus lowering its concentration; and second, it works as a resin extender, being incorporated into the cured thermoset binder without deteriorating unacceptably its properties, and thus increasing the usable solid content of the binder at low cost. Urea extension levels commonly used range from 20-40 wt.-%, depending on the starting resole, relative to the sum of the dry weight content of the resole and the weight of urea. Higher levels of urea extension, if no countermeasures are adopted, have been reported to result in reduced binder mechanical properties, particularly after ageing, together with the production of high ammonia emissions and the formation of troublesome "blue smoke" during mineral wool manufacture.

Urea might be added to the phenol-formaldehyde resole as soon as the reaction between phenol and formaldehyde is quenched. The resole and urea mixture is then allowed to react, usually at temperatures up to 60° C. and for up to 24 h. The industry often refers to this process as "premixing" or "prereacting", and the phenol-formaldehyde-urea product obtained is called "premix" or "prereact". The prereact is then stored and transported before use. There are known drawbacks associated with the application of the urea prereact method; the prereact is considerably less stable than the phenol-formaldehyde resole (the higher the ratio of urea, the less stable), what turns into much shorter usable storage times. Furthermore, temperatures <10° C. need to be avoided for the prereact.

To address the stability problems, urea might alternatively be added to the phenol-formaldehyde resole by the mineral wool manufacturer at its production site, shortly before the mixture is applied to the mineral fibers. Prolonged storage or transport of the prereact is therefore no longer needed. In this case, the industry sometimes refers to urea being "cold" added, to distinguish it from the prereact formation (in the prereact method, urea is frequently added to the resole reaction product when it is still warm). Cold urea addition has however also its disadvantages. For instance, the presence of unreacted urea, which had not sufficient time to react, has been associated with increased undesired emissions of ammonia and amines during mineral wool manufacture. Furthermore, when urea is first added just shortly prior to application to the fibers, resoles with high content of free formaldehyde need to be stored, transported and handled with the associated concerns related to their toxicity.

The combination of both prereacting and cold urea addition has been described, e.g. in patent publications U.S. Pat. Nos. 5,538,761 A1, 5,670,585 A1 and US 2007191574 A1. In these references, either the total urea extension level is higher than 40 wt.-%, or the amount of urea added cold is lower than 40 wt.-% of the total urea used, or both.

Although the use of urea has been helpful reducing the concerns related to the free formaldehyde content in the phenol-formaldehyde resole based binders, it has not been totally satisfactory regarding emissions of formaldehyde from the manufactured mineral wool products. This is due to the fact that urea-formaldehyde reaction products have been proved not to be sufficiently heat stable, and during curing at temperatures higher than 100° C., they give back formaldehyde which is released from the produced mineral wool products.

Reducing the emissions of formaldehyde from mineral wool products has been extensively researched. Most approaches entail the use of formaldehyde scavengers other than urea to trap irreversibly the excess of formaldehyde, like melamine, dicyandiamide, alkanolamines, glycine, and substances with active methylene groups, among others.

This approach has however significant drawbacks. The most important ones are the extra cost of the scavengers used, and the need for extra processing steps and installations. Additionally the scavengers might detrimentally affect the resin stability and processability.

The inventors noticed that there is a need in the field for an improved method for the manufacture of mineral wool products with a binder based on phenol-formaldehyde resoles, which avoids storing, transporting, and handling materials having high free formaldehyde content, and which results in mineral wool products with reduced formaldehyde emissions, without having to employ formaldehyde scavengers different than urea.

DETAILED DESCRIPTION OF THE EMBODIMENTS OF THE INVENTION

In view of the above, the inventors have developed an alternative method which results in combination of a number of important advantages both in the manufacture of mineral wool products and in the products themselves, advantages which are surprising and unanticipated by the prior art.

According to the invention, the method comprises a first step of providing an aqueous phenol-formaldehyde resole having free formaldehyde (step a)). In other words, the method envisages providing the aqueous product of methylolation and condensation of a phenolic compound with formaldehyde in alkaline conditions, wherein the formaldehyde is in molar stoichiometric excess in relation to the phenolic compound, so that after reaction, excess of free, unreacted, formaldehyde remains mixed with the reaction product.

In preferred embodiments, the aqueous phenol-formaldehyde resole in this step a) has a free formaldehyde content of 10 wt.-% or less, preferably of 6 wt.-% or less, and also preferably of at least 1 wt.-%, in relation to the dry weight content of the resole, when measured according to the method ISO 9397:1995 (hydroxylamine hydrochloride method).

In a subsequent step (step b)), the method foresees preparing a phenol-formaldehyde-urea prereact by contacting the phenol-formaldehyde resole with a first amount of urea (U1), and allowing the resole and urea mixture to react. When urea is contacted with the phenol-formaldehyde resole having free formaldehyde in a so-called "premixing" step, and among other occurring reactions, urea reacts with the free formaldehyde by the methylolation of urea. As a result, the content of free formaldehyde in the resole is abruptly reduced, proportionally to the amount of urea used. By phenol-formaldehyde-urea prereact it is meant the reaction product mixture formed when urea is contacted with the resole and after the mixture has being allowed to react for sufficient time and at sufficient temperature as to have caused the abrupt reduction of free formaldehyde content. It should be understood that reactions might still continue in the formed prereact after the formaldehyde content has reached a lower plateau, however, at a much lower rate.

In preferred embodiments, the phenol-formaldehyde resole and urea are allowed to react for at least 1 hour, preferably at a temperature between 20-60° C., to prepare the phenol-formaldehyde-urea prereact in step b).

The phenol-formaldehyde-urea prereact prepared according to the preferred embodiments is stable for at least several days, and even for at least several weeks. This time allows the transport of the prereact, e.g. from the resole producer to the mineral wool manufacturer, and its storage prior to use as part of the mineral wool binder. This prolonged stability is in part due to the comparatively lower amount of urea used in the method of the invention for the formation of prereact. By stable it is meant that the prereact does not suffer relevant deterioration of its properties, which are required for the application as part of a binder in the manufacture of mineral wool. Some of the properties of the prereact which are maintained during days or weeks are sufficient low viscosity, enough water dilutability, absence of precipitates and/or adequate B-stage gel-time.

In a subsequent step (step c)) of the method according to the invention, the phenol-formaldehyde-urea prereact formed in step b), is contacted with a second amount of urea (U2). It should be understood that this step is done separately from step b), this is, from the preparation of the prereact referred to in the previous paragraphs. In preferred embodiments, the second amount of urea (U2) is added to the prereact at least 24 h after the prereact has been formed, preferably at least 72 h. This subsequent step c) is advantageously done shortly before the mixture is applied to the surface of mineral fibers in the manufacture of mineral wool products, preferably less than 48 h before, and more preferably less than 24 h before.

The resulting phenol-formaldehyde-urea prereact and urea mixture from step c) is then applied to the surface of mineral fibers in a subsequent step d), according to the method of the invention. The mixture is applied as part of an aqueous binder optionally comprising at least one additive selected from curing catalysts (e.g. ammonium sulfate), resin extenders different than urea (e.g. carbohydrates), anti-dust agents (e.g. mineral oil), adhesion promoters (e.g. silanes) and water-repellent agents (e.g. silicones). Preferably, the binder comprises optional additives in a concentration of 1-30 wt.-% related to the non-aqueous content of the binder.

In certain embodiments, in step d) the phenol-formaldehyde-urea prereact and urea mixture from step c) is applied to the surface of the fibers as part of an aqueous binder with a non-aqueous content in the range 4-15 wt.-% relative to the weight of the aqueous binder.

Preferably, the phenol-formaldehyde-urea prereact and urea mixture and, therefore the binder, is applied by spraying onto the surface of freshly formed fibers arising from a fiberizing device.

The phenol-formaldehyde-urea prereact and urea mixture applied as part of the binder to the fibers is then cured in a subsequent step (step e)) in the method according to the invention.

In preferred embodiments, the phenol-formaldehyde-urea prereact and urea mixture is cured by passing the mineral fibers bearing it through an air-circulated curing oven set at temperatures above 100° C., preferably at a temperature between 140-180° C. The curing time preferably ranges from 3-5 minutes.

According to the invention, the method is further characterized by the combination of the features that the total amount of urea (Ut) used in both steps b) and c) ranges 10-40 wt.-% relative to the sum of the dry weight content of the phenol-formaldehyde resole and the total weight amount of urea (Ut), and that the second amount of urea (U2) used in step c) is at least 40 wt.-% of the total amount of urea (Ut) used. Consequently, the total amount of urea (Ut) used results from adding the first amount of urea (U1) used for the prereact formation in step b) and the second amount of urea (U2) used for the formation of the prereact and urea mixture in step c).

In preferred embodiments, the second amount of urea (U2) used in step c) is at least 50 wt.-% of the total amount of urea (Ut) used.

The inventors surprisingly found that, starting from the same free formaldehyde content in the phenol-formaldehyde resole, and with the same total amount of urea used, by the method according to the invention, mineral wool products are obtained with formaldehyde emissions which are significantly reduced compared with the emissions measured in the case of methods where the same total amount of urea is used solely during the formation of the prereact, i.e. without split urea additions, or in methods where the amount of urea added shortly before contacting the fibers is lower than 40 wt.-% of the total urea. Without wanting to be bound by theory, it appears that the spit urea addition to the resole, with the second addition making more than 40 wt.-% of the total urea, and where the second amount of urea (U2) is contacted with the prereact shortly before it is applied to the mineral fibers, modifies the reaction pathways during curing, so that it results in a higher amount of formaldehyde being irreversibly locked to the polymeric thermoset network formed during curing.

An additional advantage of the method of the invention is that the first amount of urea (U1) can be added by the phenol-formaldehyde resole manufacturer itself, as soon as the condensation reaction for its production is finished, to obtain a prereact with significantly lower free formaldehyde than the resole obtained from condensation. For instance, the amount of urea used in this premixing step can be selected so, that it is sufficient to reduce the free formaldehyde content in the prereact to 0.9 wt.-% or less related to the dry weight content of the prereact, preferably to 0.2 wt.-% or less as measured according to the ISO 11402:2004 (KCN method). The prereact, having such an importantly reduced free formaldehyde content, is less troublesome regarding potential toxicological and environmental concerns associated to formaldehyde during storage, transport and handling of this material.

Thus, in preferred embodiments of the invention, the first amount of urea (U1) contacted with the phenol-formaldehyde resole in step b) is selected to be sufficient as to produce a phenol-formaldehyde-urea prereact with a free formaldehyde content of 0.9 wt.-% or less, preferably of 0.2 wt.-% or less, as measured according to the ISO 11402:2004 (KCN method) and related to the dry weight content of the prereact.

The lower amount of urea used in the premixing step in the method of the invention, compared with the situation where the same total amount of urea (Ut) is used but undivided (this is, all of the urea applied in the premixing step), results in a higher prereact stability. The prereact obtained in preferred embodiments is stable for at least one week, usually even for several weeks. With stable it is meant that the properties of the prereact which are crucial for its applicability in the manufacture of mineral wool are practically not deteriorated during this time. Such properties are for example good water dilutability, low viscosity, absence of precipitates or adequate B-stage gel time, to name the most important ones.

The comparatively lower amount of urea used in the premixing step in the method of the invention also opens the way to the use of phenol-formaldehyde resole with relatively lower contents of free formaldehyde. It has been reported that an addition of large molar stoichiometric excess of urea in relation to the free formaldehyde in the resole for the preparation of the prereact, can result in troublesome precipitation of phenol-formaldhehyde tetradimer and in the reduction of the stability of the prereact. Due to the relative reduced amount of urea used in the preparation of the prereact in the method of the invention, resoles with lower free formaldehyde content, e.g. with free formaldehyde content of 10 wt.-% or less in relation to the dry weight content of the resole, can be used without compromising unacceptably the stability of the formed prereact.

The invention also concerns the mineral wool products with reduced formaldehyde emissions obtained by the method according to the embodiments described herein, as well as the use of these mineral wool products for the insulation of buildings, transportation, air-conducting ducts or appliances.

Additionally, certain embodiments of the invention relate to a method for the preparation of a phenol-formaldehyde-urea prereact with low free formaldehyde content, wherein the method comprises providing a phenol-formaldehyde resole having a free formaldehyde content of 10 wt.-% or less, preferably of 6 wt.-% or less, also preferably of at least 1 wt.-%, related to the dry weight content of the resole, contacting the resole with a sufficient amount of urea, as to reduce the free formaldehyde content in the prereact to 0.9 wt.-% or less, preferably 0.2 wt.-% or less, according to ISO 11402:2007 (KCN method) and related to the dry weight content of the prereact, and allowing the resole and urea mixture to react, preferably for at least 1 h, more preferably for at least 2 h. Also preferably, the amount of urea in this embodied method for the preparation of a prereact is at least 5 wt.-%, more preferably at least 10 wt.-%, and preferably at most 20 wt.-%, related to the dry weight content of the prereact. In these embodiments, the phenol-formaldehyde resole is preferably substantially free of nitrogenated compounds (compounds comprising at least one nitrogen atom), particularly substantially free of a compound selected from urea, ammonia, ammonium inorganic or organic salts, alkanolamines, alkylamines and/or melamine.

By substantially free, along this description, it is meant that the concentration of the corresponding compound in the resole, prereact or binder, is sufficiently low as to be negligible. In this context, it should be understood however that the compound in question might be present as traces, e.g. from unintended cross-contamination, preferably at a concentration of ≤0.1 wt.-% related to the dry weights of the resole, prereact or binder.

In the context of this disclosure, dry weight content is defined as the weight fraction of residue remaining after drying 3 g of the aqueous composition (resole, prereact or binder) at 135° C. for 1 hour in a ventilated oven, as measured e.g. according to ISO 3251:2008.

The term binder refers to the aqueous mixture of components which is applied to the fibers in the manufacture of mineral wool products and subsequently cured to produce the bonding of the fibers at their cross-over points by the cured binder. The binder is commonly prepared on-site, meaning that the binder is prepared in the mineral wool production plant, usually continuously, shortly before it is applied to the fibers.

By curing it is meant that the material in question undergoes a setting reaction (hardening or crosslinking reaction), e.g. when heated over 100° C. in a curing oven (thermosetting).

The aqueous phenol-formaldehyde resole suitable for the method of the present invention is a water soluble curable resole having free formaldehyde, resole which is produced by methylolation and condensation of a phenolic compound with formaldehyde in the presence of an alkaline catalyst by methods known in the art. In resoles, the molar ratio of phenol:formaldehyde is <1. Phenol-formaldehyde resoles are reactive mixtures with methylol functional groups, which undergo a self-curing reaction under influence of heat or acids. The resoles are thus partially reacted thermosets, also known as resins, prepolymers or precondensates, stable at low temperature and alkaline pH, and which can be further condensed to a thermoset in a curing reaction by application of heat and/or at acidic pH value. The skilled person is aware of how such resole is commonly manufactured and recognizes how to modify the different reaction phases and parameters to obtain the characteristics described in the preferred embodiments of the invention. Such parameters include e.g. the phenol:formaldehyde molar ratio, the catalyst type and amount, and the condensation reaction time and temperature.

The phenol:formaldehyde molar ratio for the preparation of the resole of the method of the invention is preferably in the range 1:2-1:6. The stoichiometric excess of formaldehyde assures the predominant formation of low molecular weight species from methylolation and condensation, lower solution viscosity and low free phenol content in the resole. The molar excess of formaldehyde also has the consequence that free, unreacted, formaldehyde is contained in the aqueous resole after reaction.

Although for the sake of clarity in this description the suitable resole is referred to as phenol-formaldehyde resole, it has to be understood that it is not implied that the resole might only comprise unsubstituted phenol and formaldehyde as components. Other components might be present in the resole without departing from the scope of the invention. Such components can be for instance substituted phenol derivatives such as alkylphenols, phenol esters, or resorcinol and its derivatives, or formaldehyde related compounds such as paraformaldehyde, or higher aldehydes such as butyraldehyde, acrolein or glyoxal. Other compounds having hydroxy or carboxy groups can be also reacted with phenol and formaldehyde, such as carbohydrates or alkanolamines, and even compounds having functional groups different than hydroxy or carboxy, such as hexamethylenetetramine, can included in the reaction. It is however preferred that the sum of the weights of unsubstituted phenol and formaldehyde in the resole totals at least 80 wt.-%, preferably at least 90 wt.-%, of the dry weight of the resole.

According to certain embodiments of the invention, the free formaldehyde content in the resole is preferably 10 wt.-% or less, more preferably 6 wt.-% or less, also preferably at least 1 wt.-%, related to the dry weight content of the resole, when measured according to the method ISO 9397: 1995 (hydroxylamine hydrochloride method). A central advantage of using resole with these levels of free formaldehyde content in the method of the invention is that mineral wool products obtained by applying the method of these embodiments are satisfactory in mechanical performance, and additionally they have lower emissions of formaldehyde. In particular, sufficiently low free formaldehyde content in the resole allows the manufacture of mineral wool products with formaldehyde emissions lower than 10 $\square$g/m$^3$, and more preferably lower than 8 $\square$g/m$^3$. The formaldehyde emissions from mineral wool products relate to the emissions when the products are stored in a test chamber with air exchange and under controlled conditions for 28 days and then, the formaldehyde concentration in the air in the chamber is measured according to standard method ISO 16000-3:2011.

According to the method of certain embodiments, the preferred phenol-formaldehyde resole has a dry weight content of 40-60 wt.-%. The content of unreacted free phenol in the resole is preferably at most 6 wt.-%, more preferably at most 2 wt.-%, with respect to the resole dry weight content. The water dilutability of the resole in demineralized water at 20° C. is suitably greater than 10 parts by weight (this is, at least 10 g of water can be added to 1 g of resole before permanent turbidity appears), preferably greater than 20 parts, and more preferably greater than 50 parts. The resole viscosity is preferably at most 50 mPa·s at 20° C., more preferably at most 30 mPa·s, when measured for the resole aqueous solution with 45 wt.-% dry weight content. The pH of the resole solution is preferably higher than 8, more preferably higher than 8.5, and even more preferably higher than 8.9. The B-Stage gel time of the resole preferably ranges from 2 to 15 minutes at 130° C. The methods used to determine these values are known to the skilled person, and explained briefly with some level of detail below.

In preferred embodiments, the phenol-formaldehyde resole, before it is contacted with urea to form the phenol-formaldehyde-urea prereact, has a total concentration of nitrogen lower than 1.0 wt.-%, preferably lower than 0.6 wt.-%, related to the dry weight content of the resole. Preferably, this resole is substantially free of nitrogenated compounds (compounds comprising at least one nitrogen atom), particularly substantially free of a compound selected from urea, ammonia, ammonium inorganic or organic salts, alkanolamines, alkylamines and/or melamine.

The phenol-formaldehyde resole, according to certain embodiments of the invention, is substantially free of formaldehyde scavengers selected from the group of amines, tannins, sulfite and bisulfite salts, compounds with methylene active groups, glycine, resorcinol and its derivatives, alkanolamines, and mixtures thereof.

Resoles with the properties described in preferred embodiments herein are available from resole manufacturing companies such as Momentive Performance Materials or Prefere Resins.

The method according to the invention comprises a step (step b)) of contacting the phenol-formaldehyde resole with a first amount of urea (U1), and allowing the resole and urea mixture to react, in order to prepare a phenol-formaldehyde-urea prereact. The contacting step can be done by adding the urea (both in solid or liquid form), normally under efficient stirring, to the aqueous resole composition. After the urea and the resole are contacted, they are vigorously mixed and allowed to react by leaving the mixture to evolve during at least 1 hour, preferably for at least 2 hours, either in the same reactor used for the preparation of the resole, or in a separated container. The temperature during this step b) preferably does not exceed 70° C., to avoid advancing the condensation beyond the desired point. This temperature preferably ranges between 20-60° C., including the contacting, the mixing and the reacting phases leading to the prereact formation.

In preferred embodiments of the invention, the first amount of urea (U1) contacted with the phenol-formaldehyde resole in step b) is selected to be sufficient as to produce a phenol-formaldehyde-urea prereact with a free formaldehyde content of 0.9 wt.-% or less related to the dry weight content of the prereact, preferably of 0.2 wt.-% or less, as measured according to the ISO 11402:2004 (KCN method).

The first amount of urea (U1) preferably ranges from 5-20 wt.-%, preferably from 10-15 wt.-%, related to the sum of the dry weight of the phenol-formaldehyde resole and the total amount of urea (Ut).

Particularly good results of prereact stability, low free formaldehyde prereact content and low formaldehyde emissions have been achieved when using a resole with free formaldehyde content of less than 6 wt.-% related to the dry weight content of the resole, contacted with a first amount of urea (U1) of at least 5 wt.-%, more preferably at least 10 wt.-%, and preferably at most 20 wt.-%, relative to sum of the resole dry weight and the weight of the total amount of urea (Ut).

In a subsequent step c), the phenol-formaldehyde-urea prereact formed in step b) is contacted with a second amount of urea (U2) to produce a mixture of prereact and urea. The start point of this step c) is separated in time from the end of step b), preferably at least for 24 hours, and more preferably at least for 72 hours. This step c) will usually be done by the mineral wool manufacturer at its facilities, shortly before the prereact and urea mixture is applied to the mineral fibers in the manufacture of mineral wool products. In contrast with this, the preparation of the phenol-formaldehyde-urea prereact will usually be done by the resole producer, who delivers the finished prereact to the mineral wool manufacturer.

In step c), the phenol-formaldehyde-urea prereact and the second amount of urea (U2) can be contacted and well mixed in a container adapted for this purpose, or alternatively, and currently less preferred, the contacting/mixing can be done continuously "in-line" in the mineral wool manufacturing line, as the mixture is transported to the binder application station. The prereact and second amount of urea (U2) mixture is preferably kept at a temperature lower than 50° C., preferably lower than 40° C., and more preferably under 30° C. at all time, until it is applied onto the surface of the mineral fibers, to avoid premature advance of the condensation reaction.

The phenol-formaldehyde-urea prereact and the second amount of urea (U2) are contacted and mixed shortly before the resulting mixture is applied to the surface of mineral fibers, preferably less than 48 h before, and more preferably less than 24 h before.

The method according to the invention foresees the combination of features that the total amount of urea (Ut), this is, the sum of the first (U1) and second (U2) amounts of urea used in steps b) and c), ranges 10-40 wt.-%, preferably 15-35 wt.-%, relative to the sum of the dry weight of the phenol-formaldehyde resole and the total weight amount of urea (Ut); and that the second amount of urea (U2) used in step c) is at least 40 wt.-%, preferably at least 50 wt.-%, of the total amount of urea (Ut). The inventors surprisingly found that when this combination of features is used, the emissions of formaldehyde from the mineral wool products manufactured is significantly reduced compared with the case where the same total amount of urea is only used in the preparation of the prereact (without "cold" urea addition), or when the second amount of urea (U2) added "cold" is less than 40 wt.-% of the total amount of urea (Ut).

In order to manufacture mineral wool products according to the method of the invention, in a further step d), the mixture of phenol-formaldehyde-urea prereact and second amount of urea (U2) from step c) is applied to the surface of mineral fibers. The mixture of prereact and second amount urea (U2) is applied to the fibers as part of a binder. The binder optionally comprises additives employed either to assist in the manufacture of mineral wool products or to improve the mineral wool product properties. The binder is preferably an aqueous composition with a non-aqueous content in the range 4-15 wt.-%, relative to the aqueous binder weight.

The optional additives comprised in the binder, in addition to the phenol-formaldehyde-urea prereact and the second amount of urea (U2), are preferably in a concentration of more than 1 wt.-% and less than 30 wt.-% related to the non-aqueous content of the binder. The optional additives include at least one additive selected from the following groups of substances: i) curing catalysts, such as ammonium sulfate; ii) resin extenders different than urea, such as carbohydrates; iii) anti-dust agents such as mineral oil; iv) adhesion promoters such as silanes; and v) water repellent agents such as silicones, and more particularly reactive silicones. It is particularly preferred to include up to 10 wt.-% of molasses and/or glucose as resin extender.

In preferred embodiments, the mixture of phenol-formaldehyde-urea prereact and second amount of urea (U2) will be largely diluted with fresh or process water, and optionally mixed with the additives in order to prepare the binder. Wherein no additives are used, the binder might comprise only the prereact and second amount of urea (U2) mixture, preferably diluted with water to the desired concentration.

The concentration of the different components in the binder preferably ranges from 60-90 wt.-% of phenol-formaldehyde resole, 10-40 wt.-% total urea (sum of first (U1) and second (U2) amounts of urea) and 1-20 wt.-% of additives, based on the non-aqueous weight of the binder.

In preferred embodiments, the mixture of the phenol-formaldehyde-urea prereact and the second amount of urea (U2) is applied in atomized form to the attenuated individual fine mineral fibers being produced by a fiberizer from a hot molten mineral mixture. The atomization can be produced by spraying nozzles or similar devices oriented in a direction so that the sprayed mixture meets the surface of the attenuated fibers. The mixture contacts the surface of the mineral fibers when they are still warm. The impregnated fibers are collected on a foraminous conveyor in a forming chamber, where a primary un-cured mat is formed. A significant part of the water comprised in the binder is evaporated at this stage.

Next, the primary mat is densified and transported by a series of conveyors to a heated curing oven. The binder is then cured at temperatures above 100° C., preferably at a temperature between 140-180° C. The curing time preferably ranges from 2-5 min. The cured mineral wool mat is afterwards trimmed and shaped into its final dimensions, optionally rolled up, and packaged.

In certain embodiments, the phenol-formaldehyde-urea prereact and second amount of urea (U2) mixture is applied as part of a binder to the fibers in an amount to produce a content of solid binder related to the weight of the mineral fibers in the final mineral wool product after curing between 3 and 15 wt.-%. The amount of cured binder relative to the mineral fiber weight in the mineral wool product is measured as LOI (loss on ignition) according to ISO 29771: 2008.

It has been found that when: 1) the phenol-formaldehyde resole has a free formaldehyde content lower than 6 wt.-% related to the dry weight content of the resole; 2) the first amount of urea (U1) ranges from 5-15 wt.-% relative to the sum of the dry weight of the resole and the total amount of urea (Ut); 3) when the second amount of urea (U2) ranges from 15-35 wt.-% related to the sum of the dry weight of the resole and the total weight amount of urea (Ut); and 4) the total amount of urea (Ut) adds up to 20-40 wt.-% related to the sum of the dry weight of the resole and the total weight amount of urea (Ut), the mineral wool products manufactured according to this embodiment of the method of the invention, and without the need of using further formaldehyde scavengers, surprisingly exhibit formaldehyde emissions lower than 10 □g/m³, and even lower than 8 □g/m³, when measured according to ISO 16000-3:2011.

Testing Methods

The free formaldehyde content of the resole is measured for instance according to the international standard ISO 9397:1995, using the hydroxylamine hydrochloride procedure. This method involves the following general principle: The formaldehyde present in the resole is converted to the oxime with hydroxylamine hydrochloride. Then the hydrochloric acid formed during this reaction is determined by potentiometric back-titration, using a sodium hydroxide solution. The free formaldehyde content of the resole with respect to its dry content is then calculated from the amount of sodium hydroxide.

The free formaldehyde content of the phenol-formaldehyde-urea prereact is measured according to ISO 11402:2004, using the KCN method.

The free or unreacted phenol content of the resole is measured for instance according to the international standard ISO 8974:2002. This international standard determines the free phenol content by gas chromatography using either a weighed amount of internal standard being added to the test portion or using a stock solution of internal standard. The internal standard used is 1-octanol. The free phenol content of the resole is then calculated with respect to its dry weight content.

The content of nitrogen in the phenol-formaldehyde resole is measured for instance with the Kjeldahl method.

The resole water dilutability (or miscibility) is measured with demineralized water and at 20° C. according to the international standard ISO 8989:1995 method. Resole dilutability is a measure of the mass of demineralized water relative to the mass of aqueous resole which results in permanent turbidity in the liquid resole. This method involves adding water to the resole until turbidity persists for a minimum of 30 seconds after agitation.

The viscosity of the resole is measured at 20° C. using a Brookfield viscometer, for example with the spindle 1 and 60 r.p.m. The viscosity as referred to in the present invention is based on an aqueous resole having a dry weight content of 45 wt.-%.

The B-Stage gel-time of the resole is measured at 130° C. according to the international standard ISO 8987:2005.

The content of cured binder in the mineral wool product (LOI) is measured according to the international standard ISO 29771:2008.

The amount of formaldehyde emissions from mineral wool products is measured from freshly manufactured samples, for instance, according to ISO 16000-3:2011. The method involves placing the fresh samples into a 212 l acclimatized glass chamber equipped with a ventilator and set at a temperature 23±1° C., a relative humidity of 50±5%, air flow 0.2±0.1 m/s and an air exchange rate 0.5 h⁻±5% for 28 days. Other settings are the loading factor of 1 m² of sample surface per m³ of test chamber volume, and a specific area air exchange rate of 0.5 m³/m² h. Emitted formaldehyde is determined in □g/m³ from air samples of the air in the chamber taken on to adsorbent cartridges coated with 2,4-dinitrophenylhydrazine (DNPH) at the time of the measurement (after 28 days in this case) and the hydrazones formed are subsequently analyzed by high performance liquid chromatography (HPLC) with detection by ultraviolet absorption.

EXAMPLES

A commercially available phenol-formaldehyde resole characterized by having a pH 9.6, viscosity 20 mPa·s, dilutability in demineralized water >50, B-Stage gel-time of 3 min, 45 wt.-% dry weight content, was employed for the manufacture of glass wool products in an industrial setting. This resole was further characterized by a phenol content under 2 wt.-%, nitrogen content <0.6 wt.-%, and free formaldehyde content of 6 wt.-%, all wt.-% based on the resole dry weight content.

In inventive examples, two amounts of urea U1 and U2 were added to the phenol-formaldehyde resole in two separated steps. The first amount U1 was used to prepare a phenol-formaldehyde-urea prereact, and it was added to the same reactor where the resole had been prepared, once the condensation reaction was quenched. The mixture was allowed to react for several hours in the same reactor, before it was stored for transport. One week later, in the glass wool manufacturing plant, the second amount of urea U2 was added to the prereact and mixed under agitation at approx. 25° C., 2-4 hours before it was employed for the manufacture of glass wool products.

A binder mixture was continuously prepared in the glass wool manufacturing line, by mixing the resulting mixture of prereact and second amount of urea U2, with water, ammonium sulfate, mineral oil and aminopropyltrimethoxysilane. The binder was applied to the surface of glass wool fibers, in form of small drops, by spraying rings, as the fibers from a disc fiberizer, attenuated by hot air blowers, fell down to a foraminous conveyor belt. The glass fibers bearing the binder were collected in the form of an uncured mat, densified and transported to a curing oven, where the binder was heated to a temperature between 140-180° C. for 3-5 minutes to produce its curing. After curing, the produced glass wool mat had a density of 29.5 kg/m³ and a thickness of 100 mm. The cured binder content measured as LOI was 6.5 wt.-% related to the weight of the fibers.

In comparative examples, the same procedure was repeated, except that either all the urea was added undivided, in one single step, for the formation of the prereact, and that no urea was subsequently added to the prereact, or the second amount of urea (U2) was lower than 40 wt.-% relative to the total urea amount (Ut).

Table 1 depicts the amounts of urea U1 and U2 as weight percentages relative to the sum of the dry weight content of the resole and total urea weight, in inventive and comparative examples, as well as the results obtained of formaldehyde emissions after 28 days from the glass wool products manufactured.

TABLE 1

|  | 1ˢᵗ Urea amount U1 (wt.-%) | 2ⁿᵈ Urea amount U2 (wt.-%) | Formaldehyde emissions (□g/m³) |
|---|---|---|---|
| Example 1 (inventive) | 15 | 15 | 9 |
| Example 2 (inventive) | 10 | 20 | 7 |
| Example 3 (comparative) | 30 | 0 | 17 |
| Example 4 (comparative) | 25 | 5 | 15 |

The phenol-formaldehyde-urea prereact of example 1 and 4 had a free formaldehyde content of <0.2 wt.-% related to the dry weight of the prereact. The products obtained from Examples 1 and 2 showed markedly reduced formaldehyde emissions when compared to Examples 3 and 4, despite the relative total urea amount being the same in all examples.

What is claimed is:

1. A method for the manufacture of mineral wool comprising:
   a) providing an aqueous phenol-formaldehyde resole having a free formaldehyde content of not more than 6% by weight, and less than 1% nitrogen by weight,
   b) preparing a phenol-formaldehyde-urea prereact by contacting the resole with a first amount of urea to form a first mixture and allowing the first mixture to react for at least one hour at a temperature in the range of 20-60° C.; wherein the first amount of urea ranges from 5-20 wt.% related to the sum of the dry weight of the phenol-formaldehyde resole and a total amount of urea used in b) and c);
   c) contacting the prereact with a second amount of urea for at least 24 hours after b) has ended to result in a second mixture and subsequently maintaining the mixture below 50° C.;
   d) applying the resulting second mixture of prereact and second amount of urea, as part of a binder, optionally with additives, to the surface of mineral fibers within 48 hours subsequent after b) has ended; and
   e) curing the binder on the surface of the mineral fibers; wherein:
   the total amount of urea used in b) and c) ranges 5-20 wt. % relative to the sum of the dry weight of the phenol-formaldehyde resole and the total amount of urea; and
   the second amount of urea used in c) is at least 40 wt.-% of the total amount of urea, and
   the method excludes addition of formaldehyde scavengers different than urea.

2. The method according to claim 1, wherein the second amount of urea used in c) is at least 50 wt.-% of the total amount of urea.

3. The method according to claim 1, wherein the phenol-formaldehyde resole in a) has a free formaldehyde content at most 10 wt.-% related to the dry weight content of the resole.

4. The method according to claim 1, wherein the phenol-formaldehyde resole has a water dilutability at 20° C. greater than 10 parts by weight, a viscosity of at most 50 mPa·s at 20° C. and 45 wt.-% dry weight content, a pH higher than 8, and a B-stage gel time ranging from 2-15 minutes at 130° C.

5. The method according to claim 1, wherein in d), the mixture of prereact and second amount of urea is applied to the mineral fibers as part of a binder comprising additives in a concentration of 1-30 wt.-% related to the non-aqueous content of the binder.

6. The method according to claim 1, wherein the first amount of urea in b) is selected to produce a prereact with a free formaldehyde content of 0.9 wt.-% or less, preferably of 0.2 wt.-% or less, related to the dry weight content of the prereact.

7. The method according to claim 1, wherein the phenol-formaldehyde resole in b) is substantially free of formaldehyde scavengers selected from a group consisting of amines, tannins, sulfite and bisulfite salts, compounds with methylene active groups, glycine, resorcinol and its derivatives, alkanolamines, and mixtures thereof.

* * * * *